(12) United States Patent
Lennon

(10) Patent No.: US 8,926,396 B2
(45) Date of Patent: Jan. 6, 2015

(54) FLYWHEEL MOTOR AND GYROSCOPIC CLUTCH

(71) Applicant: Mattel, Inc., El Segundo, CA (US)

(72) Inventor: Berrigan August Romig Lennon, Los Angeles, CA (US)

(73) Assignee: Mattel, Inc., El Segundo, CA (US)

( * ) Notice: Subject to any disclaimer, the term of this patent is extended or adjusted under 35 U.S.C. 154(b) by 110 days.

(21) Appl. No.: 13/833,615

(22) Filed: Mar. 15, 2013

(65) Prior Publication Data

US 2013/0244537 A1    Sep. 19, 2013

Related U.S. Application Data

(60) Provisional application No. 61/611,794, filed on Mar. 16, 2012.

(51) Int. Cl.
| | | |
|---|---|---|
| *A63H 17/00* | (2006.01) | |
| *A63H 17/26* | (2006.01) | |
| *A63H 29/20* | (2006.01) | |
| *A63H 17/42* | (2006.01) | |
| *F03G 3/08* | (2006.01) | |
| *A63H 1/00* | (2006.01) | |

(52) U.S. Cl.
CPC ............... *A63H 17/26* (2013.01); *A63H 29/20* (2013.01); *A63H 17/42* (2013.01); *F03G 3/08* (2013.01)
USPC ........................... 446/437; 446/233; 446/462

(58) Field of Classification Search
CPC ..... A63H 17/00; A63H 17/004; A63H 17/26; A63H 17/36; A63H 17/262; A63B 21/22; A63B 23/14; B62D 57/00; B62D 57/02; B62D 57/022

USPC ......... 446/233, 437, 454–457, 460, 462, 465, 446/470, 471, 442

See application file for complete search history.

(56) References Cited

U.S. PATENT DOCUMENTS

| | | | |
|---|---|---|---|
| 1,538,205 A | 5/1925 | Munday | |
| 1,821,940 A | 9/1931 | Hinsen | |
| 2,708,811 A * | 5/1955 | Crowder | ...................... 446/442 |
| 3,229,413 A | 1/1966 | Bross | |

(Continued)

FOREIGN PATENT DOCUMENTS

CN    201727965 U    2/2011

OTHER PUBLICATIONS

Search Report issued Jun. 13, 2013 in EP Application No. 13159594.

*Primary Examiner* — Kien Nguyen
(74) *Attorney, Agent, or Firm* — Panitch Schwarze Belisario & Nadel LLP

(57) ABSTRACT

An inertia motor for a toy has a housing supporting a rotating flywheel. The flywheel has a disk with generally radially movable elements, movement of which vary the moment of inertia of the disk. Another element is supported by the housing so as to be movable towards and away from the disk and is located so as to be able to engage at least one of the movable elements when the flywheel has slowed sufficiently. Angular momentum and energy in the flywheel at engagement is transferred to the housing. The housing may also include a transmission such as a gear train to connect the flywheel with one of more elements of the toy to be powered by the flywheel.

20 Claims, 8 Drawing Sheets

(56) References Cited

U.S. PATENT DOCUMENTS

| | | |
|---|---|---|
| 3,650,067 A | 3/1972 | Greenwood |
| 3,886,682 A | 6/1975 | Ieda et al. |
| 3,932,957 A | 1/1976 | Morrison et al. |
| 3,984,939 A | 10/1976 | Wolgamot et al. |
| RE30,299 E | 6/1980 | Greenwood |
| 4,363,186 A | 12/1982 | Goldfarb et al. |
| 4,400,908 A | 8/1983 | Nomura |
| 4,479,326 A | 10/1984 | Kennedy et al. |
| 4,526,554 A | 7/1985 | Goldfarb et al. |
| 4,556,396 A | 12/1985 | Kennedy et al. |
| 4,556,397 A | 12/1985 | Arad et al. |
| 4,568,309 A | 2/1986 | Maxim et al. |
| 4,582,171 A | 4/1986 | Jezierski |
| 4,631,041 A | 12/1986 | Chang et al. |
| 4,680,021 A | 7/1987 | Maxim |
| 4,850,931 A | 7/1989 | Auer |
| 5,820,439 A | 10/1998 | Hair, III |
| 6,024,627 A | 2/2000 | Tilbor et al. |
| 6,482,069 B1 | 11/2002 | Tilbor et al. |
| 6,565,409 B1 | 5/2003 | Isogai et al. |
| 6,676,476 B1 | 1/2004 | Lund et al. |
| 6,682,394 B2 | 1/2004 | Tilbor et al. |
| 6,764,374 B2 | 7/2004 | Tilbor et al. |
| 2002/0137428 A1 | 9/2002 | Tilbor et al. |
| 2003/0104758 A1 | 6/2003 | Tilbor et al. |
| 2004/0087244 A1 | 5/2004 | Tilbor et al. |
| 2004/0198157 A1 | 10/2004 | Tilbor et al. |
| 2005/0181703 A1 | 8/2005 | Kuralt |
| 2006/0258261 A1* | 11/2006 | Tse et al. .................. 446/442 |

* cited by examiner

FLYWHEEL MOTOR AND GYROSCOPIC CLUTCH

CROSS-REFERENCE TO RELATED APPLICATIONS

This application is related to U.S. Provisional Patent Application No. 61/611,794 filed Mar. 16, 2012 and incorporated by reference herein in its entirety.

BACKGROUND OF THE INVENTION

Flywheel equipped motors, have been long known in the toy industry. Toy vehicles using commonly referred to friction motors are shown, for example, in U.S. Pat. Nos. 1,538,205; 3,650,067; 3,932,957 and 4,631,041. The flywheel is geared to an external wheel which can be accelerated by pushing or driving the vehicle to accelerate the flywheel, after which the flywheel drives the external wheel. Still other flywheel motors used in toys can be accelerated by other means, such as pull cords as shown, for example in U.S. Pat. Nos. 3,229,413 and 3,932,957.

Still other toy vehicles have been designed to skid out from a direction of movement as a stunt. These include, for example, U.S. Pat. Nos. 3,984,939; 4,582,171; 4,850,031; 6,565,409. Heretofore it has been unknown how to utilize a flywheel motor to provide propulsion and a skid to a toy vehicle. Such a motor also could be useful to provide multiple actions in other types of toys including tops, dolls and figures, which have also previously employed flywheel motors.

BRIEF SUMMARY OF THE INVENTION

A toy vehicle has a variable inertia flywheel motor. Mechanical means are provided for transferring solely within the vehicle, angular momentum from the flywheel to the vehicle, when the flywheel has slowed sufficiently after propelling the vehicle, to cause the vehicle to spin in the direction of rotation of the flywheel at the end of travel of the vehicle.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

DETAILED DESCRIPTION OF THE INVENTION

Figure 1:
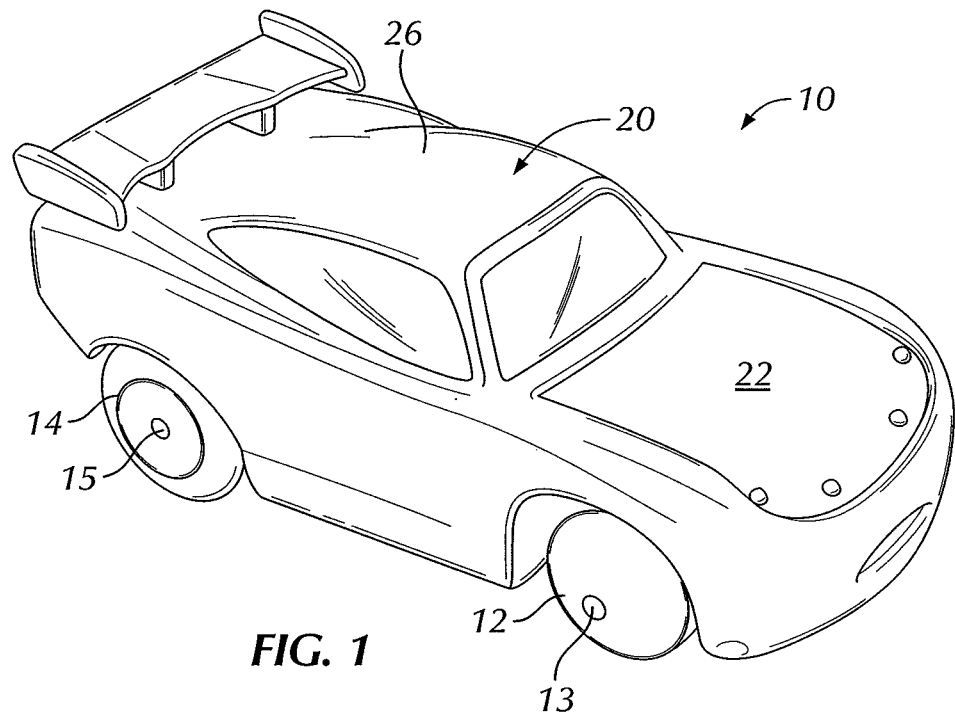
FIG. 1 is a perspective view of the top, front and right side of a toy vehicle, the other side of the vehicle being a mirror image.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the stated component and designated parts thereof. The terminology includes the words above specifically mentioned, derivatives thereof and words of similar import.

Figure 2:
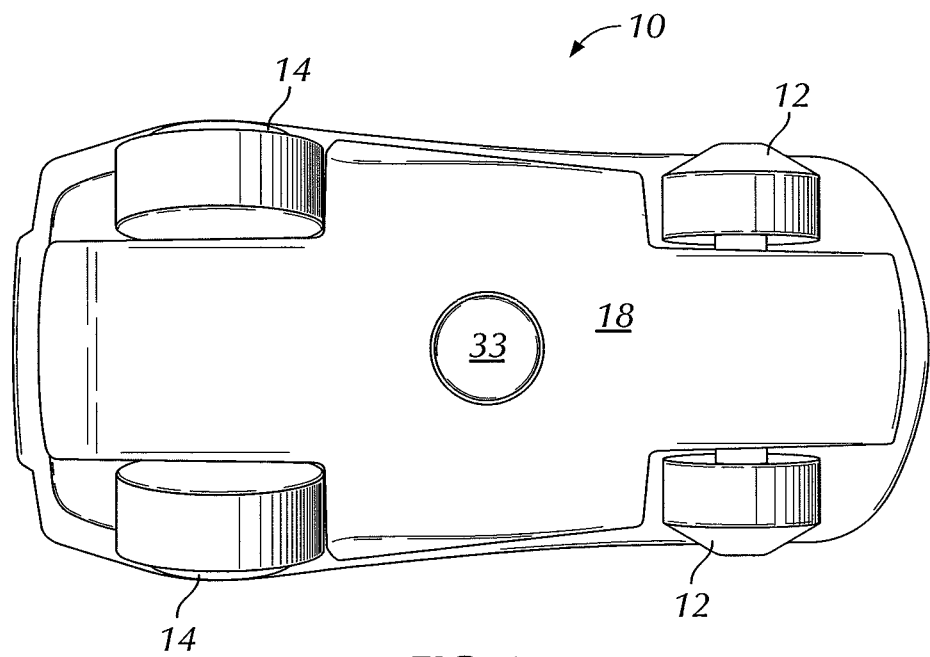
FIG. 2 is a bottom view of the vehicle of FIG. 1.
Figure 3:
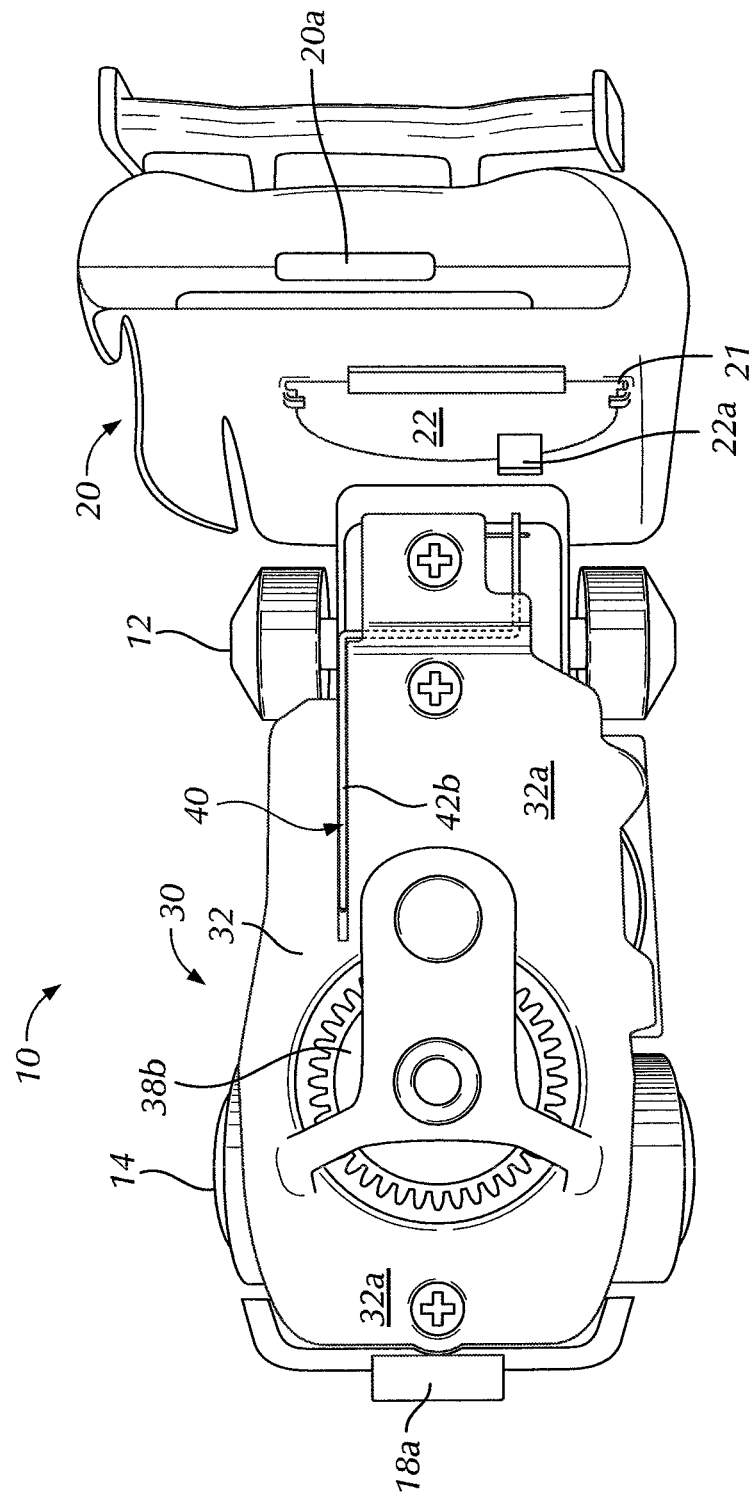
FIG. 3 is a top view with the body of the vehicle pivoted up at the front end from the chassis exposing the top of the friction motor/flywheel drive assembly.
Figure 4:
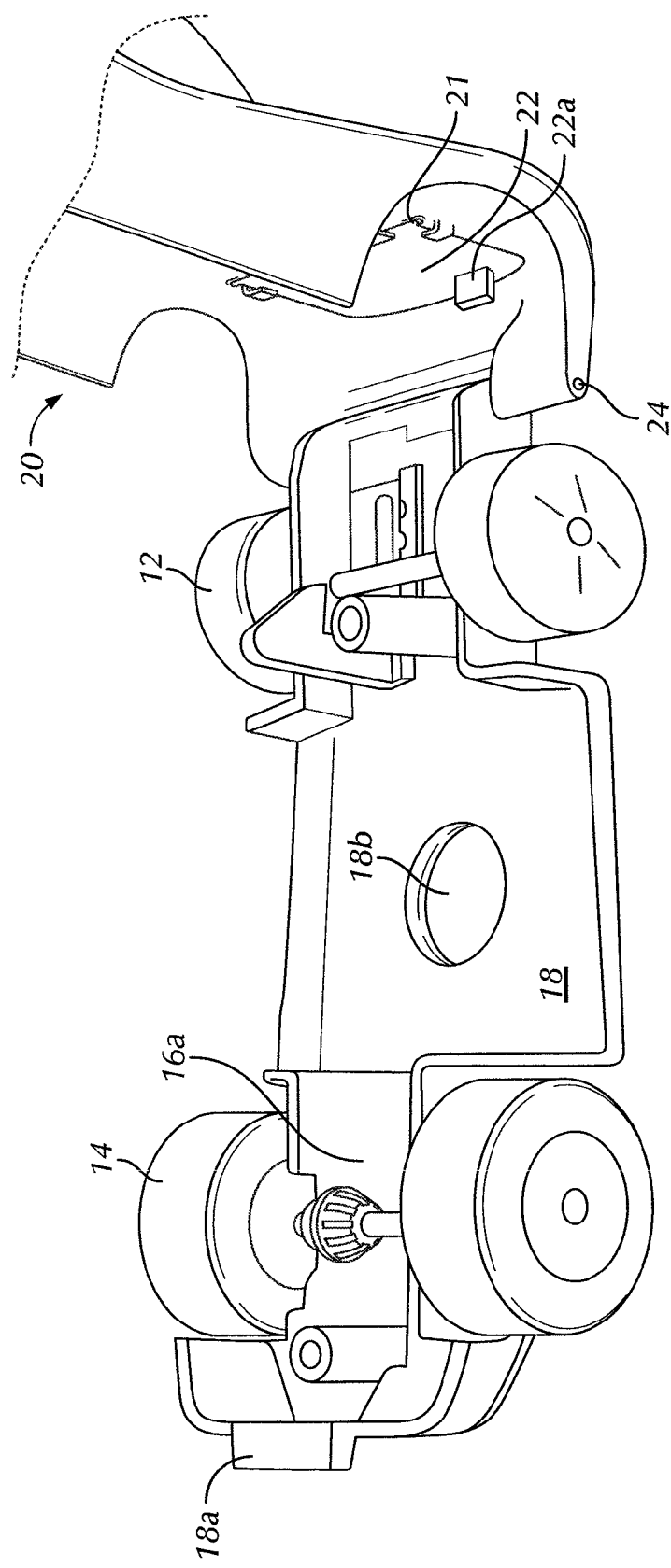
FIG. 4 is a side view of the vehicle with the friction motor/flywheel drive assembly removed.
Figure 5:
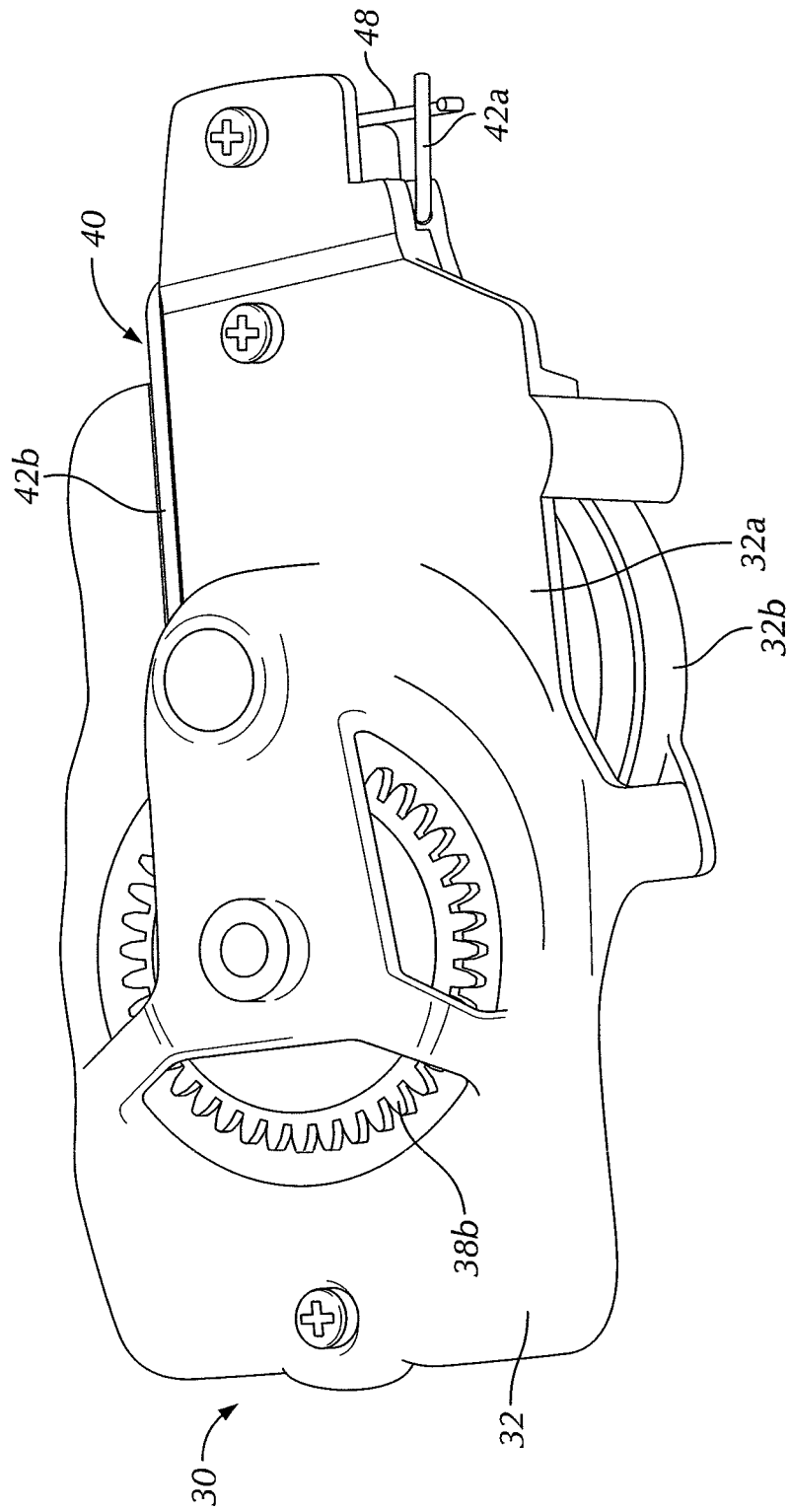
FIG. 5 is a side view of the friction motor/flywheel drive assembly removed from the chassis and body of the vehicle.

Referring variously to FIGS. 1 through 3, a toy vehicle 10 according to the present invention includes a pair of front wheels 12 mounted to a front axle 13 for free rotation on or with the axle in the vehicle 10 and a pair of rear wheels 14 mounted on a rear axle 15 in the vehicle 10. A bevel gear 16 (FIG. 4) is fixed to the rear axle 15 to rotate with the rear axle 15 and pair of rear wheels 14. Toy vehicle 10 is preferably of a chassis 18 and body 20 construction but paired shells and other monocoque constructions might be used. The front end of the body 20 is preferably hinged to the front end of the chassis 18 by a pin 24 as shown in FIG. 4 but other, conventional attachments, fixed or releasable or removable, might be used. A tab 18a at the rear end of the chassis 18 remote from hinge pin 24 is releasably received in a slot 20a on the rear of the body 20 to releasably secure the rear ends together.

Referring to FIGS. 1, 3 and 4, body 20 include a hood 22 secured by a hinge at 21 (FIG. 3) to a remainder 26 of the body 20 so as to pivot or at least flex downward at its forward end. Referring to FIGS. 3-4, a tab 22a projects downwardly and inwardly from the inner side of the hood 22 towards the chassis 18. Tab 22a is used to operate a clutch of an inertia motor with variable inertia flywheel, which is indicated generally at 30 in FIGS. 3 and 4-6 and is supported on the chassis 18 beneath the body 20.

A variable inertia flywheel motor 30 includes a housing 32 with mating top 32a and bottom 32b parts. Referring to FIGS. 5-7 and 9, a bent wire member 40 is pivotally supported by the housing 32. The transmission is comprised of a train of gears 36, 38, 54 that rotatably connect the road contacting rear wheels 14 with the flywheel of the motor 30. Wire member 40 is basically a crank shaped lever with front and rear, generally parallel arms 42a, 42b connected by a transverse portion 42c that is movably secured with the housing 32 by being pivotally captured between the housing parts 32a, 32b. The front arm 42a extends forwardly/outwardly from the transverse portion 42c (FIGS. 6 and 7) along the right side of the motor housing 32 while the rear arm 42b extends inwardly/rearwardly from portion 42c along the left side of the housing 32. An innermost free end of the rear arm 42b is most proximal to the flywheel and is bent down, transversely to the arm 42b, and to a plane generally formed by portions 42a-42c, to form a hook 42d (FIG. 9). The innermost end 44 of arm 42b with hook 42d is extended into the housing 32 through an opening in the top part 32a (FIG. 3) and is movable up and down through that opening. The front arm 42a preferably engages a bias member in the form of a length of spring wire 48 (FIGS. 5, 6 and 8) preferably supported transversely by the housing 32 preferably between the parts 32a, 32b, so as to extend beneath the front arm 42a and bias it upward. This, in turn, biases the hook 42d downward and deeper into the housing 32. In this way, the bent wire member 40 is supported by and through the housing 32 for movement into and away from engagement with a flywheel in the housing 32.

Figure 6:
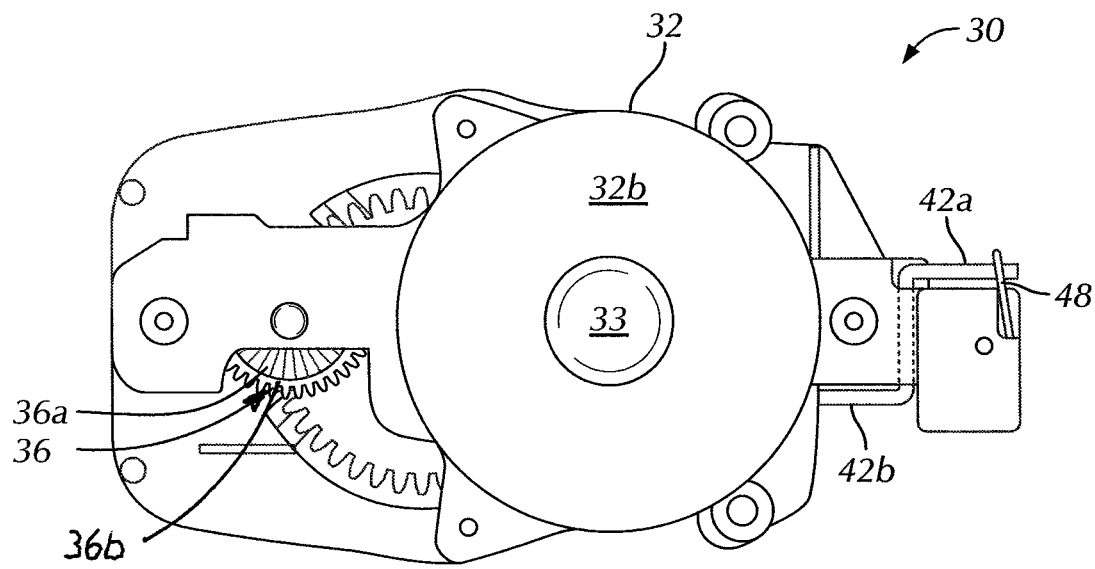
FIG. 6 is a perspective view of the friction motor/flywheel drive assembly of FIG. 5 inverted to show its bottom side.
Figure 7:
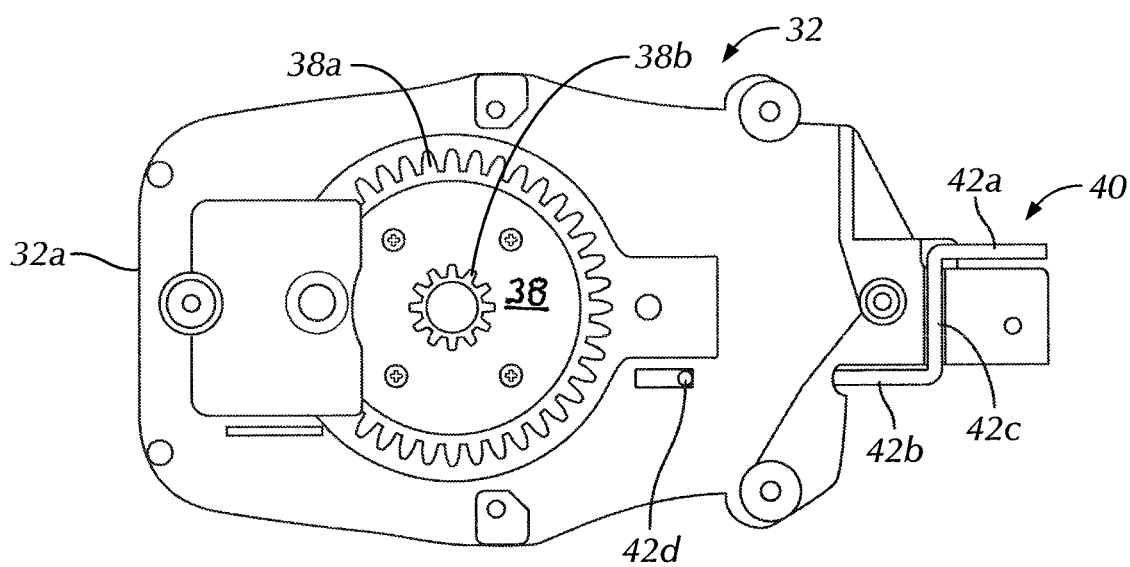
FIG. 7 is a generally plan view of the inner, downward facing side of the upper part of the friction motor/flywheel drive assembly housing.
Figure 8:
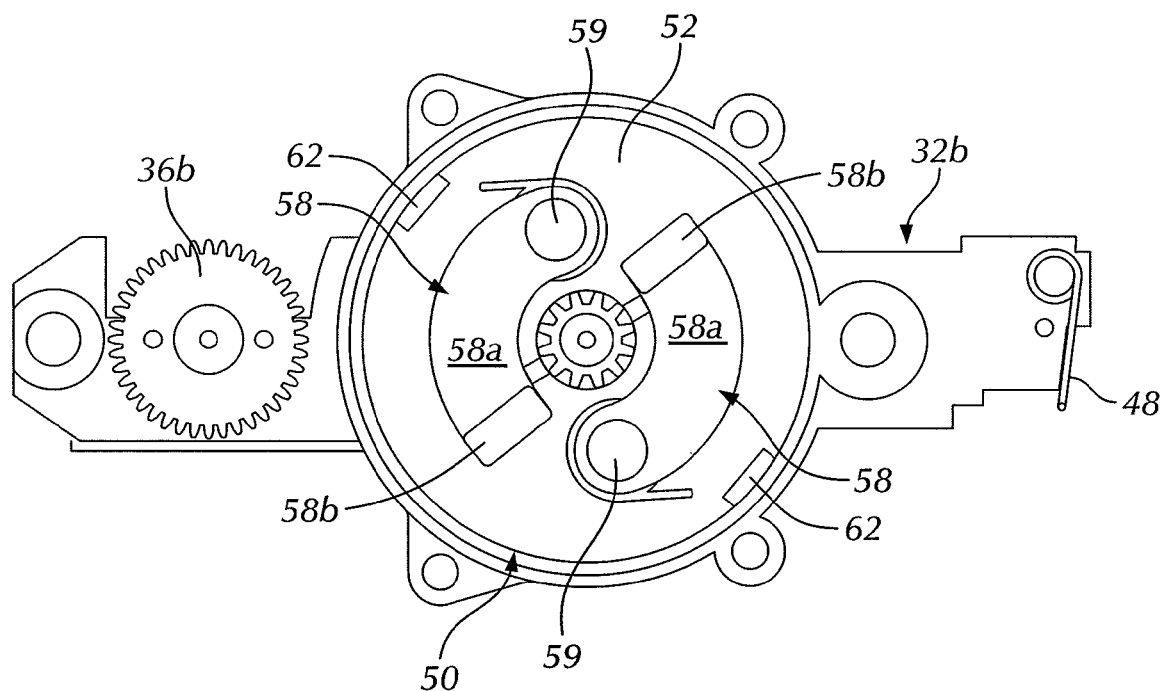
FIG. 8 is a generally plan view of the inner, upward facing side of the lower part of the friction motor/flywheel drive assembly housing.
Figure 9:
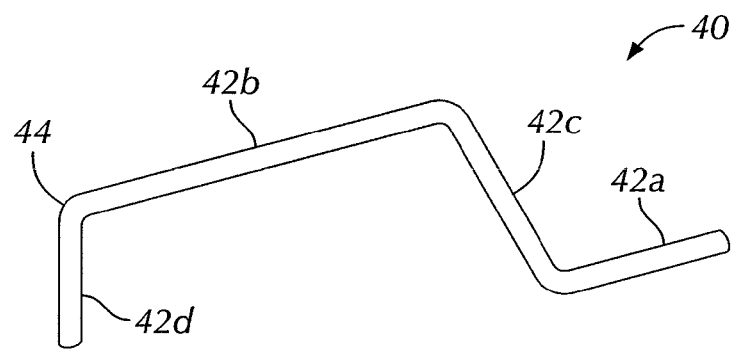
FIG. 9 is a perspective view of the bent wire member or catch of the gyroscopic clutch of the friction motor/flywheel drive assembly.

Referring primarily to FIGS. 6, 7 and 8, the transmission in the form of gear train 36, 38, 54 connects the rear wheels 14 through the rear axle 15 and rear axle bevel gear 16 (see FIG. 4) with the flywheel of the motor 30. More particularly, the exemplary gear train includes two sets of fixedly paired gears supported between the housing parts 32a, 32b on each of two vertical, parallel axles. Rear axle bevel gear 16 meshes with a bevel gear 36a (FIG. 6) that is paired coaxially with a larger diameter spur gear 36b (FIG. 8). Spur gear 36b meshes with a smaller pinion 38a (FIG. 9) that is paired coaxially with a much larger spur gear 38b. Spur gear 38b meshes with a pinion 54 fixed on a vertical shaft 56, which constitutes the center axle of a flywheel indicated generally at 50 in FIG. 8.

Figure 10:
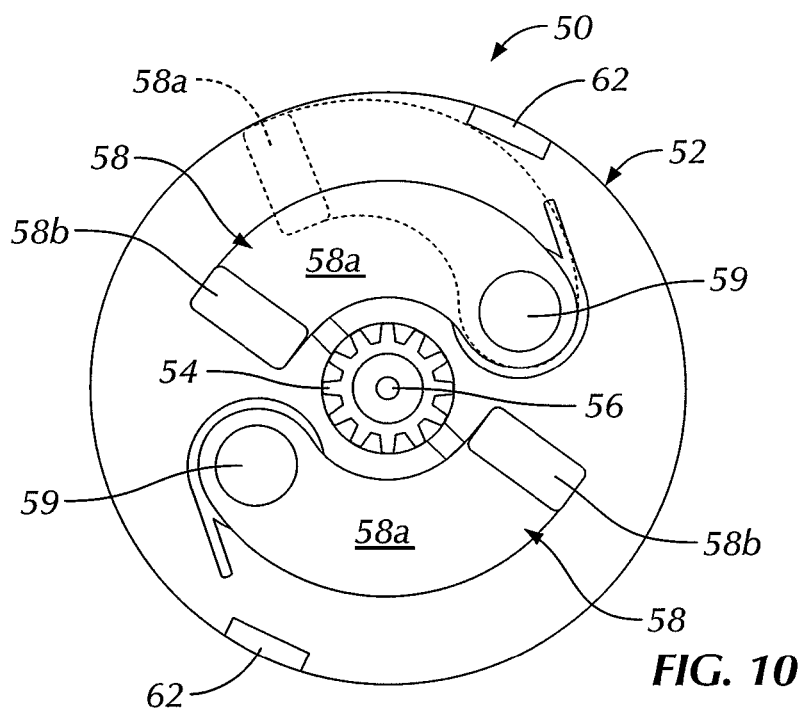
FIG. 10 is a top plan view of the variable inertia flywheel of the motor with the pivotally mounted weight arms.
Figure 11:
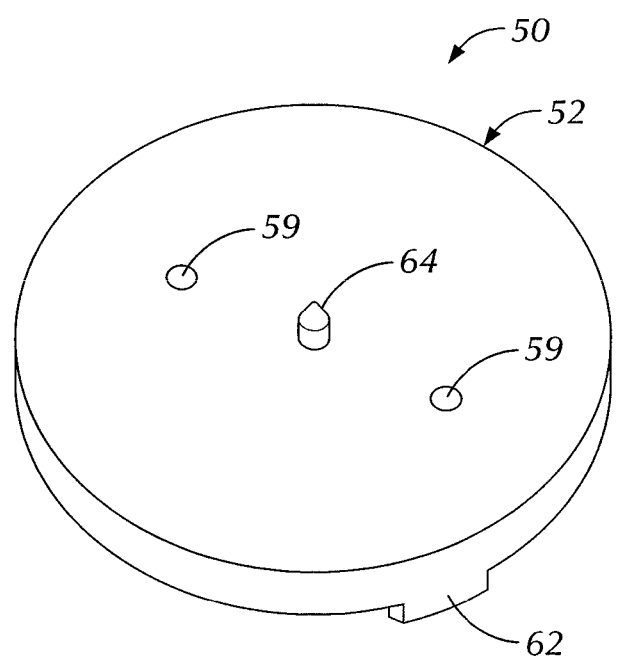
FIG. 11 is a bottom plan view of the variable inertia flywheel of FIG. 10 showing the bottom side of the flywheel disk.

Referring to FIGS. 8 and 10, the flywheel 50 is an assembly and includes a relatively weighty disk 52 (preferably metal) supported within the housing 32 for horizontal rotation with the vertical shaft 56 and a protruding pivot 64 coaxial with shaft 56 (see FIG. 11) extending downwardly from the bottom facing side of the disk 52. A hemispherical well 33 (FIGS. 2 and 6) is provided projecting from the bottom facing side of the bottom housing part 32b to receive the pivot 64. It also projects through an opening 18b (see FIG. 4) in the chassis 18 (FIG. 2) and serves to secure the motor 30 from lateral movement with respect to the chassis 18. The motor housing 32 is fixedly attached to the remainder of the vehicle 10 by conventional means such as screws or rivets but may also be immovably fixed by being fitted into a suitable configured compartment between the body and chassis. As seen in various FIGS. 8 and 10, a plurality, preferably a diametrically opposed pair of elements 58 are pivotally mounted to the disk 52 for generally radial movement with respect to the central axis of flywheel 50 and disk 52. Each element 58 is preferably a weight 58 that include an arcuate arm 58a, having an inner end that is most proximal to the center of the disk 52 and that is pivotally secured to the disk 52 by suitably means such as pin 59. The opposing, outer or free end of each arm 58a, distal from the pivot pin 59, supports a further weight in the form of an upward extending dog 58b. The dogs 58b and the arms 58a that support them also generally weighty, preferably made of metal, and are generally radially movable with respect to the rotational axis of the disk 52, which is the central axis of shaft 56 and pivot 64. Each arm 58a is biased radially inwardly towards the shaft 56 by a coil torsion spring hidden in the figures but located beneath each arm 58a and engaged at opposing ends with the disk 52 and the arm 58a. Each weight element 58 is configured so that at sufficiently high rotational speeds of the disk 52, the centrifugal force of each weight 58 overcomes the bias of its spring and each arm 58a pivots radially outwardly against the spring bias to move the dog 58b radially outwardly from an initial, at rest position maintained by the upper arm 58a in solid FIG. 10, where it will be engaged by the hook 42d of the bent wire member 40, to an extended, more radially outward position (held by the arm marked 58a' in phantom in the same figure), where the dog 58b is located radially outwardly from the hook 42d to avoid engagement with the hook 42d. Posts 62 (FIG. 10) may be provided extending upwardly at the outer circumferential periphery of the disk 52 where they might be engaged by the arms 58a to prevent over-extension of the arms 58a. Thus, elements/weights 58 are the gyroscopic elements of the clutch varying the moment of inertia of the flywheel 50 with their movement. The dogs 58b are stops releasably engaging with the bent wire member 40, which is the clutch actuator.

Figure 12:
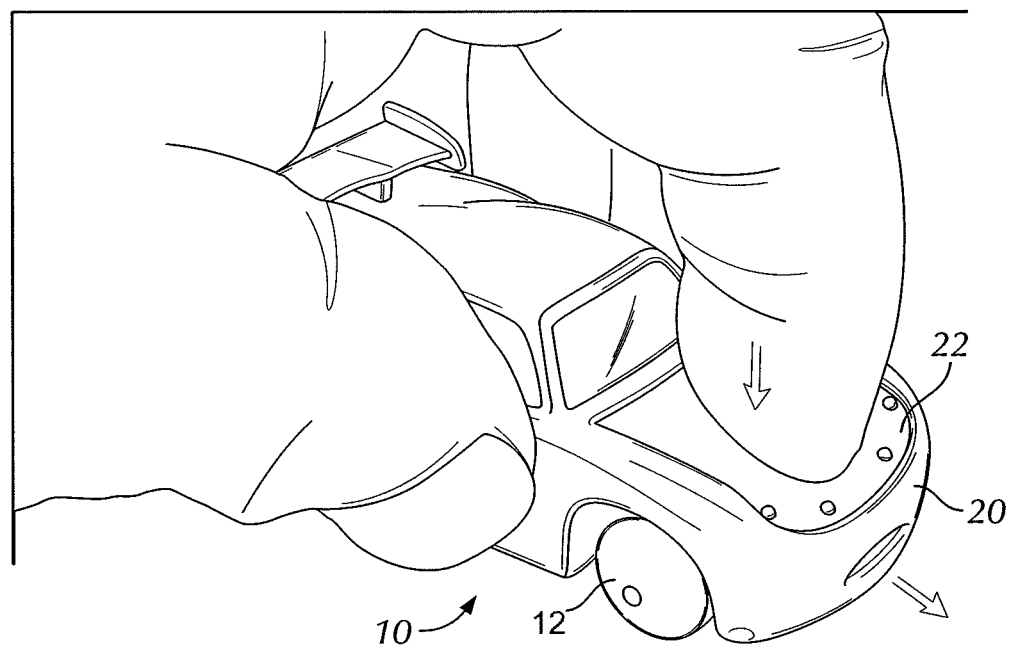
FIG. 12 is a perspective view of the toy vehicle being held with the hood pivotally depressed at the front end to disengage the bent wire member or catch of the gyroscopic clutch from the flywheel to permit acceleration of the flywheel.

The vehicle 10 is operated as follows. Referring to FIG. 12, the vehicle body 20 is held with the hood 22 inwardly depressed at the front end and the vehicle 10 pushed, preferably repeatedly, across a support surface engaged by at least the rear wheels 14 to accelerate rotation of the flywheel disk 52. The tab 22a beneath the hood 22 presses against the front arm 42a of the bent wire member 42, overcoming the bias of spring 48 and pivoting the front arm portion 42a down, which pivots the rear arm portion 42b upward and the hook 42d away from the upper side of the flywheel disk 52 and above the dogs 58b. This permits the flywheel 50 to be accelerated without interference from the bent wire member 42. In this way, the gears and flywheel 50 act like a conventional friction/flywheel motor. When a desirably fast rotation of the flywheel 50 is achieved, the vehicle 10 is released and is propelled along a generally linear path of travel by the continued rotation of the flywheel 50 driving the rear wheels 14. As energy is taken from the flywheel 50 to propel the vehicle 10, the flywheel disk 52 looses speed and the arms 58a, which were outwardly extended by the acceleration, move inward. The vehicle 10 will continue to move along the path of travel as the rear wheels 14 are rotated by the rotating flywheel 50 until one of the weight arms 58a moves sufficiently radially inwardly that its dog 58b engages the hook 42d. This engagement abruptly stops rotation of the flywheel disk 52 and of the rear wheel(s) 14 geared with the flywheel 50 and causes the angular momentum and energy remaining in the flywheel 50 at the time of engagement to be transferred entirely within the vehicle 10 to the remainder of the vehicle 10 (i.e. the chassis 18 and body 20) causing the vehicle to spin briefly in the rotational direction in which the flywheel 50 was rotating when stopped as the vehicle 10 skids to a halt on the path of travel. It will be appreciated that the bent wire member 40, being pivotally fixed in the housing 32, is itself fixedly connected to the chassis 18 through the housing 32. Engaging one of the dogs 58b of the flywheel assembly 50 is the mechanical means by which remaining angular momentum and energy in the flywheel 50 is transferred within the vehicle from the flywheel 50 through the bent wire member 40 to the vehicle 10. The moveable weight elements selectively engageable by the bent wire member 40, which is pivotally secured in the housing 32, constitute the means for transferring any rotational energy and momentum remaining in the flywheel 50 at engagement by member 40 to the motor housing 32.

While the invention is disclosed in a preferred embodiment in which the variable inertia flywheel motor used for propulsion, it should be appreciated that it could be incorporated into flywheels in other configurations and orientations and provided for other purposes. For example, instead of springs, elastic or resilient members might be used to bias stops arms 58a. Also, instead of the described pivoting crank lever 40, other mechanical arrangements can be provided between the gyroscope 50 and the motor housing 32, like the provision of a spring biased catch supported through the housing opposite the disk 52 and dogs 58b with the flywheel 50 at rest. The catch might be raised by a wedge, cam or the like or also by a separate pivotally mounted lever or pivoted away from the disk by the same or similar mechanical members. Furthermore, support arms 58a stop elements 58b or equivalent might be mounted of weight members for generally radial movement along slots in or through the disk of the flywheel, biased radially inwardly along the slot by different types of bias members. Also the toy 10 might additionally be provided with a pull cord for acceleration of the flywheel. Moreover, the invention can be incorporated into a flywheel spun about a transverse horizontal axis that is provided sometimes provided in two wheeled toy vehicles such as bikes and motorcycles to stabilize such vehicles. Depending upon where such flywheel is installed and the direction it is spun, the vehicle can be made to flip end, stop short or perform other stunts. Furthermore, while the preferred embodiment variable inertial flywheel motor 50 disclosed in the toy vehicle 10 is centered laterally in the vehicle, it need not be so located. Locating a flywheel off center may provide other unusual stunt capabilities and responses. As mentioned initially, this variable inertia flywheel motor may be used in other toys including but not limited to tops, dolls and other figures.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

The invention claimed is:

1. An inertia motor comprising:
    a housing;
    a flywheel including a disk supported by the housing for rotation about a central axis; and
    means for transferring angular momentum from the flywheel to the housing when rotation of the flywheel has slowed sufficiently.

2. The inertia motor of claim 1 wherein the means comprises:
    a member supported through the housing for movement into and away from engagement with the flywheel.

3. The inertia motor of claim 2 wherein the means further comprises:
    a plurality of elements supported by the disk for at least generally radial movement with respect to the central axis whereby the elements are radially located at a rest position for engagement by the member with the flywheel disk stopped and are located more radially outwardly from the member with rotation of the flywheel at a sufficiently high rotational speed to avoid engagement with the member.

4. The inertia motor of claim 3 wherein the member is secured with the housing sufficiently so that rotational momentum remaining in the rotating flywheel at engagement of one of the elements by the member is transferred by the member from the flywheel to the housing.

5. The inertia motor of claim 4 wherein the member is a lever pivotally supported from the housing for movement of an end of the lever most proximal to the flywheel into and away from engagement with the elements.

6. The inertia motor of claim 5 further including a bias member supported by the housing so as to bias the end of the lever most proximal to the flywheel to engage one of the elements to stop rotation of the flywheel.

7. The inertia motor of claim 5 wherein each of the flywheel elements includes an arm pivotally coupled with the disk for movement generally radially with respect to the central axis and a stop located on the arm so as to be engaged by the lever to stop rotation of the flywheel.

8. The inertial motor of claim 1 further comprising a gear train in the housing connected with the flywheel.

9. The inertia motor of claim 1 installed in a toy vehicle.

10. The inertial motor of claim 9 wherein the toy vehicle has at least one road engaging wheel and further comprising a transmission rotatably connecting the at least one road engaging wheel with the flywheel.

11. The inertia motor of claim 10 wherein the transmission is located in the housing.

12. The inertia motor of claim 9 wherein the member is a lever pivotally supported by the housing to be actuated from an exterior of the toy vehicle.

13. The inertia motor of claim 12 wherein the lever is located so as to be actuated through a body part of the toy vehicle.

14. A toy vehicle comprising:
    a plurality of road wheels supporting the vehicle for movement across a support surface;
    a motor located within the toy vehicle, the motor including a housing containing a flywheel with a disk rotating about a central axis;
    a transmission rotatably connecting the flywheel with at least one of the road wheels such that the flywheel and any connected road wheel rotate together; and
    a member movably supported so as to engage the flywheel and stop rotation of the flywheel and any connected road wheels and to cause angular momentum remaining in the flywheel at engagement to be transferred to the housing to rotate the housing in a direction the flywheel was rotating at engagement.

15. The toy vehicle of claim 14 wherein the housing is immovably supported by the vehicle and wherein the angular momentum remaining is transferred to the vehicle through the housing to rotate the vehicle in the direction the flywheel was rotating.

16. The toy vehicle of claim 14 wherein the transmission is a gear train contained in the housing.

17. The toy vehicle of claim 14 wherein the flywheel is an assembly further comprising a plurality of weights generally radially movable on the disk to vary a moment of inertia of the flywheel.

18. The toy vehicle of claim 17 wherein the weights are movable from an at rest radial position on the disk to be engaged by the member and a more radially outward position on the disk to avoid engagement by the member with the disk rotating at a sufficiently high speed.

19. A method of operating a toy having a variable inertia motor inside a body comprising the steps of:
    accelerating a variable inertia flywheel of the motor;
    permitting the accelerated flywheel to rotate and power at least one action of the toy; and
    engaging the rotating flywheel and automatically transferring an amount of angular momentum remaining in the flywheel at engagement from the flywheel to the body to cause the body to rotate while unpowering the at least one action of the toy.

20. The method of claim 19 wherein the toy is a vehicle and wherein:
    the permitting step comprises permitting the accelerated flywheel to propel the toy vehicle along a path of travel; and
    the engaging step comprises automatically transferring the amount of angular momentum remaining in the flywheel at engagement from the flywheel to the vehicle to cause the vehicle to rotate while stopping along the path of travel.

* * * * *